(12) United States Patent  
Pedersen et al.

(10) Patent No.: US 8,601,171 B2  
(45) Date of Patent: *Dec. 3, 2013

(54) METHOD FOR CONFIGURING AN ELECTRONIC DEVICE

(71) Applicant: Nokia Corporation, Espoo (FI)

(72) Inventors: Claus Pedersen, Aalborg (DK); Jacob Hansen, Naestved (DK)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,183

(22) Filed: Nov. 21, 2012

(65) Prior Publication Data

US 2013/0080753 A1    Mar. 28, 2013

Related U.S. Application Data

(63) Continuation of application No. 10/589,155, filed on May 4, 2007, now Pat. No. 8,341,302.

(51) Int. Cl.  
*G06F 3/00*    (2006.01)

(52) U.S. Cl.  
USPC .............................................................. 710/8

(58) Field of Classification Search  
USPC .............................................................. 710/8  
See application file for complete search history.

(56) References Cited

U.S. PATENT DOCUMENTS

| 6,978,453 B2 * | 12/2005 | Rao et al. ............. | 717/171 |
| 7,188,143 B2 * | 3/2007 | Szeto .................. | 709/206 |
| 7,216,298 B1 * | 5/2007 | Ballard et al. ......... | 715/760 |

OTHER PUBLICATIONS

"SyncML Meta-Information DTD," Dec. 7, 2000, pp. 1-15.*

* cited by examiner

*Primary Examiner* — Chun-Kuan Lee  
(74) *Attorney, Agent, or Firm* — Ditthavong, Mori & Steiner, P.C.

(57) ABSTRACT

A method for automatically configuring an electronic device comprising:  
receiving at an electronic device a command identifying first data;  
automatically determining a property of the identified first data;  
automatically identifying an executable from the determined property; and  
operating on the identified first data using the identified executable.

20 Claims, 3 Drawing Sheets

METHOD FOR CONFIGURING AN ELECTRONIC DEVICE

CROSS REFERENCE AND RELATED APPLICATIONS

This application is a continuation of U.S. application Ser. No. 10/589,155 filed May 4, 2007, the entirety of which is incorporated herein.

FIELD OF THE INVENTION

Embodiments of the present invention relate to configuring an electronic device. Particular embodiments relate to a standard process for configuring mobile cellular telephones at, for example, the point of sale.

BACKGROUND OF THE INVENTION

A current trend is for electronic devices to have more features. This can make the electronic devices difficult to configure.

A user of a device may spend a considerable amount of time and effort configuring a device's settings so that it works correctly and/or as they would wish. A new device may appear less attractive to a user because the time and effort required may be very great.

This is particularly true for mobile cellular telephones. Mobile telephones are typically designed so that they can be configured for use in any one of a plurality of different cellular radio telephone networks controlled by different operators. However, each operator may require different settings to enable the telephone to operate correctly or in the way in which the operator desires. The operator (service provider) may wish to customise the mobile telephone with the necessary settings.

In addition, a mobile telephone is personal device and a user may wish to configure it with their favorite ring tones, internet bookmarks, screen savers etc.

It is therefore desirable to provide some form of automatic set-up process for electronic devices and, in particular, mobile cellular telephones.

It would be desirable for this set-up process to be such that it can be used with more than one electronic device without specific adaptation for that device. For example, it would be desirable if the set-up process may be used to initially configure all or most mobile cellular telephones.

The inventors considered whether automatic set-up would be possible using a SyncML message to transfer data to a target device and perform executables on the transferred data at the target device.

SyncML™ Device Management (DM) is an open, universal industry standard. It gives third parties, such as service providers and corporate information management departments, the ability to create and manage a management tree stored in a mobile device. SyncML Device Management Tree and Description, v1.1.1, 10 Feb. 2003, (www.syncml.org) describes the creation and maintenance of a management tree. A management tree has nodes connected by branches. Each node can be uniquely addressed by a URI. A node may be an interior node, which may have any number of child (dependent) nodes, but cannot store any value or a node may be a leaf node, which cannot have child (dependent) nodes but can store a value. A value may be a string, a file, a number etc. SyncML DM therefore provides a mechanism for providing data on-the-fly to the mobile device.

SyncML Representation Protocol, v1.1, 15 Feb. 2002, (www.syncml.org) specifies the common Extensible Markup Language (XML) syntax and semantics usable by all SyncML protocols, including the Data Management (DM) protocol.

The commands include: Add, Copy, Delete, Exec, Get, Replace. Exec allows the originator of the command to ask that a named executable is invoked by the recipient.

SyncML Device Management Tree and Description, v1.1.1, 10 Feb. 2003, (www.syncml.org) describes how Add is used to create a management tree. SyncML DM does not specify how an executable can be performed on particular data using SyncML DM. The exec command contains an item element, which contains a target element, which contains a LocURI element. The LocURI element specifies only the location of the executable in the device. Therefore the exec command does not allow the data to be used by the executable to be specified.

Furthermore the exec command requires the identification of a suitable executable in the target device. There must therefore be prior knowledge of the identity of the executable at a target device, which is specified in the LocURI element of the exec command. This is complex and inconvenient and prevents a single SyncML Message or Package being used with multiple mobile devices.

It would be desirable to create a SyncML code is suitable for performing a common process on a plurality of target devices that does not require specific adaptation for use with each device.

It would be desirable to instruct an executable to be performed on particular data using SyncML code that can be re-used for other devices.

BRIEF DESCRIPTION OF THE INVENTION

According to one embodiment of the invention there is provided a method for automatically configuring an electronic device comprising: receiving at an electronic device a command identifying first data; automatically determining a property of the identified first data; automatically identifying an executable from the determined property; and operating on the identified first data using the identified executable.

According to another embodiment of the invention there is provided a method for configuring a mobile cellular telephone comprising: transferring code comprising a command to a mobile cellular telephone, wherein the command identifies a first leaf node of a hierarchical nodular data structure; determining a property of the identified first leaf node; identifying an executable from the determined property; and operating on data stored at the identified first leaf node using the identified executable.

According to another embodiment of the invention there is provided a method for configuring a plurality of mobile cellular telephones comprising:
transferring re-usable code to a mobile cellular telephone wherein the code comprises: commands for creating at the electronic device a hierarchical nodular data structure, having leaf nodes and interior nodes, that comprises first data stored at a first leaf node; and a first command identifying the first leaf node;
determining a property of the identified first leaf node;
identifying an executable from the determined property;
and operating on the first data stored at the first leaf node using the identified executable.

According to another embodiment of the invention there is provided a mobile cellular telephone arranged for automatic configuration comprising: means for storing first data; means for receiving a command identifying the first data; means for determining a property of the identified first data; means for identifying an executable from the determined property; and means for operating on the identified first data using the identified executable.

According to another embodiment of the invention there is provided a data structure for re-use in setting-up different mobile cellular telephones, comprising: code identifying first data and specifying execution of an unidentified executable on the first data.

According to another embodiment of the invention there is provided a data structure for re-use in setting-up different electronic devices, comprising: commands for creating at an electronic device a hierarchical nodular data structure, having leaf nodes and interior nodes, that comprises first data stored at a first leaf node; and a first command identifying the first leaf node that specifies execution of an unidentified executable on the first data stored at the first node.

Embodiments of the invention may enable an executable resident on a target device to be executed without specifying the identity of that executable. As the identity of a resident executable may vary from device to device, this allows SyncML code to be re-used to perform a common process on a plurality of target devices.

Embodiments of the invention may enable an executable resident on a target device to be used on specified data.

According to another embodiment of the invention there is provided a system for creating a data structure for re-use in setting-up different electronic devices, comprising: means for associating each one of a plurality of user friendly commands with different code portions, each of which includes one or more commands.

BRIEF DESCRIPTION OF THE DRAWINGS

For a better understanding of the present invention reference will now be made by way of example only to the accompanying drawings in which.

DETAILED DESCRIPTION OF THE INVENTION

Figure 1:
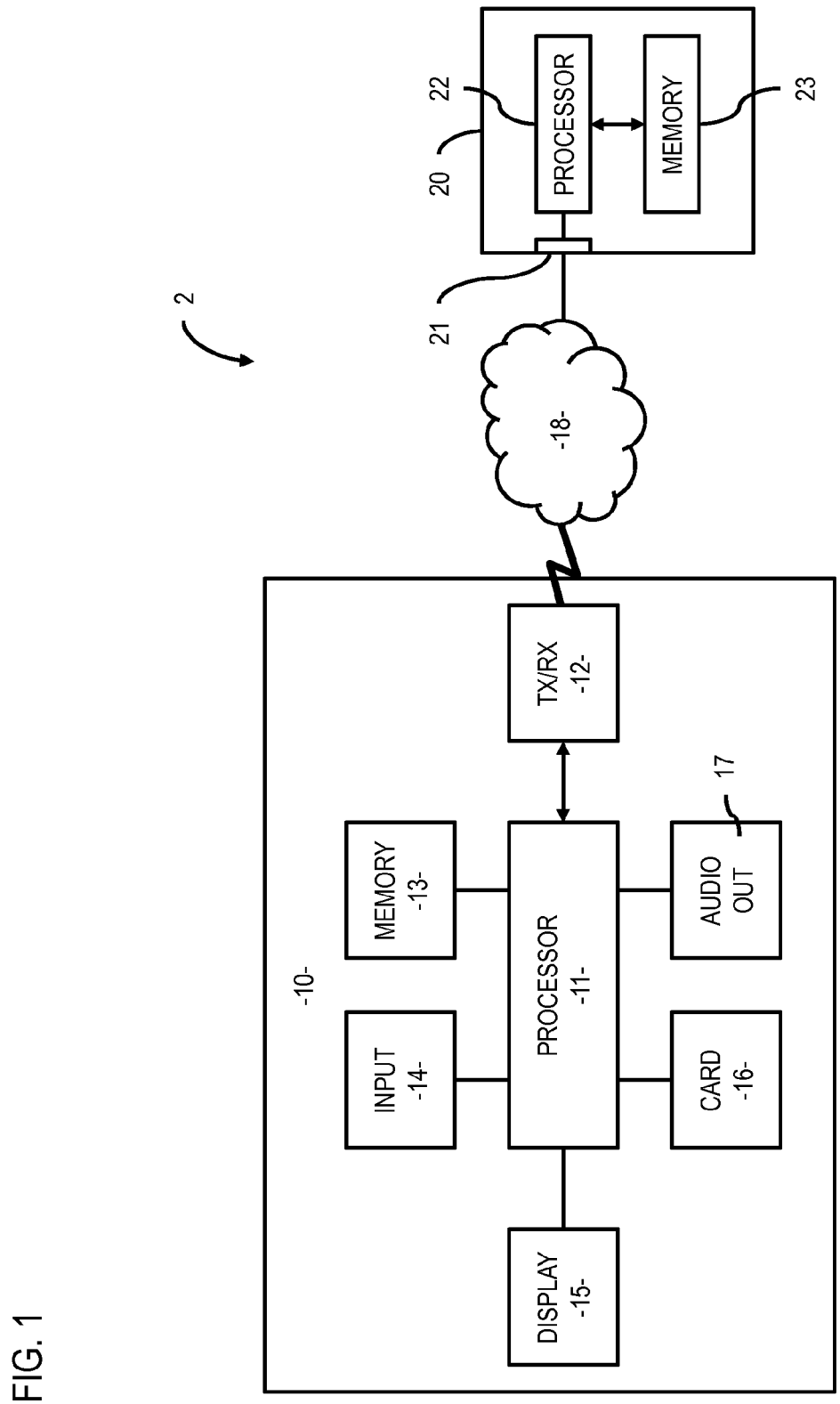
FIG. 1 illustrates client-server system comprising a mobile device communicating with a server 20.

FIG. 1 illustrates a client-server system 2 comprising a mobile device 10 communicating via a cellular radio telephone network 18 with a server 20. The mobile device 10, in this embodiment a mobile cellular telephone, comprises: a processor 11, a cellular radio transceiver 12, a memory 13, an input device 14 e.g. a keypad, a display 15, a smart card 16 and an audio output device 17.

The processor 11 controls the mobile telephone 10. It is connected to write to and read from the memory 13. It receives input data from the keypad 14 and provides output data to the display 15 and audio output device 17. It controls the cellular radio transceiver so that it can communicate in the cellular telephone network 18 which may be, for example, a GSM or WCDMA network. The processor is also connected to the smart card 16, which at least provides user identification information to the processor such as the user's telephone number or IMSI. The operation of the processor 11 is controlled by software stored in the memory 13 and loaded into the processor. In operation, the processor receives and transmits data via the transceiver 12 and writes and reads data from the memory 13.

It should be appreciated, that in other embodiments the mobile cellular telephone may not have a smart card 16 and/or may have multiple processors.

The server 20 comprises an input/output interface 21 connected to the cellular radio network 18 either directly or indirectly, a processor 22 and a memory 23. The server 20 is a SyncML DM server. It issues SyncML DM commands to the mobile telephone 10 via the input/output interface 21 and correctly interprets responses from the mobile telephone 10.

In the mobile telephone 10, processor 11 operates as a management client (MC) and can maintain a management tree data structure 100 in the memory 13. The MC correctly interprets SyncML DM commands received from the server, executes appropriate actions in the mobile telephone 10 and sends back relevant responses to the issuing management server via the transceiver 12.

A management tree is a hierarchical nodular data structure by which the management client interacts with the mobile telephone 10. The MC may store or retrieve values from the tree and manipulate the properties of the tree. The management tree has nodes connected by branches. Each node can be uniquely addressed by a URI. A node may be an interior node, which may have any number of child (dependent) nodes, but cannot store any value or a node may be a leaf node, which cannot have child (dependent) nodes but can store a value. A value may be a string, a file, a number etc.

The management tree can be manipulated by the MC. New nodes can be created and the values at certain leaf nodes can be changed. There is synchronous run time access to the leaf nodes and interior nodes.

Figure 3:
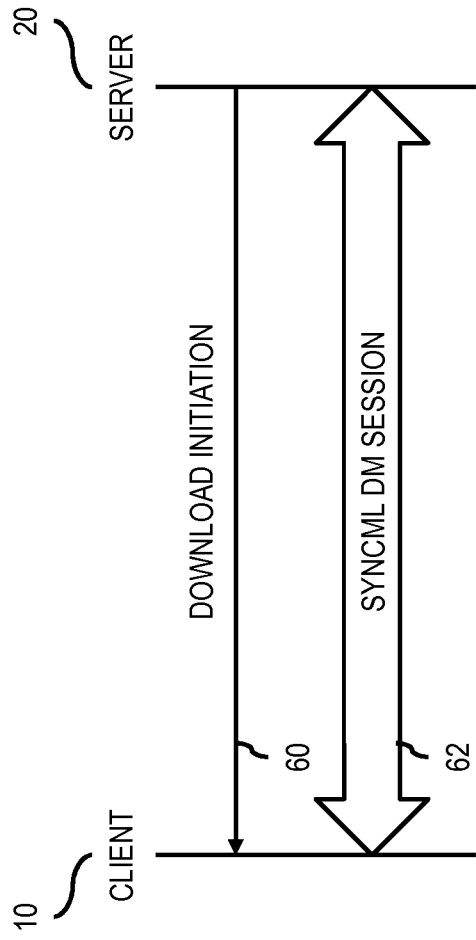
FIG. 3 is a signaling diagram for download of a set-up code.

As will be described in more detail below, the MC in response to receiving set-up code from the server 20 creates an 'operator' management object as part of the automatic set-up process. As illustrated in FIG. 3, this 'operator' management object 102 is, in this example, a sub-tree depending from the root 104 of the management tree 100 and is used during the set-up process.

The automatic set-up process may, for example, be initiated by inserting a smart card 16 into the cellular mobile telephone 10. The smart card 16 contains the necessary information to bootstrap the automatic set-up process. The mobile device 10 sends a download initiation message 60 as illustrated in FIG. 3 to the server 20.

The server 20 stores set-up code 50 in memory 23, which is usable with multiple devices without adaptation. The server 20 in response to the download initiation message initiates a SyncML Data Management (DM) Session 62. The DM session 62 is used to transfer the stored set-up code 50 to the mobile device 10.

The download initiation message 60 may be sent by any suitable means such as a Short Message Service (SMS) message or, if the device is a personal digital assistant without mobile telephone capabilities via IR, Bluetooth or a serial data connection such as USB.

The set-up code may be sent by any suitable means such as a Short Message Service (SMS) message or, if the device is a personal digital assistant without mobile telephone capabilities via IR, Bluetooth or a serial data connection such as USB.

Figure 4:
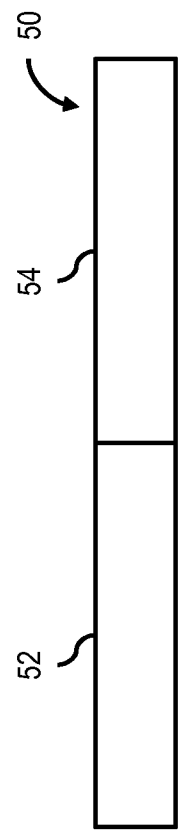
FIG. 4 schematically illustrates the content of the set-up code 50.

The set-up code 50 is schematically illustrated in FIG. 4. The set-up code 50 is a data structure for re-use in setting-up different mobile devices.

The set-up code 50, in this example, comprises two portions, which are logically separate but which may be interleaved. There is a first portion 52 for creating a management tree or updating an existing management tree. There is a second portion 54 for carrying out executables.

The first portion 52 for updating an existing management tree comprises a sub-portion for creating internal nodes of the management tree and a sub-portion for creating leaf nodes of the management tree.

As an example, the code may create an interior node 'Operator' 106 depending from the root 104 using XML code similar to this:

```
<Add>
<CmdID> 1</CmdID>
<Item>
    <Meta>
        <Format xmlns='syncml:metinf'> node   /<Format>
        <Type xmlns='syncml:metinf'> interior /<Type>
    </Meta>
    <Target>
        <LocURI> /Operator </LocURI>
    </Target>
</Item>
</Add>
```

As an example, the code may subsequently create an interior node 108 depending from the 'Operator' node 106 using XML code similar to this:

```
<Add>
<CmdID> 2</CmdID>
<Item>
    <Meta>
        <Format xmlns='syncml:metinf'> node   /<Format>
        <Type xmlns='syncml:metinf'> interior /<Type>
    </Meta>
    <Target>
        <LocURI> /Operator/ring_tones </LocURI>
    </Target>
</Item>
</Add>
```

As an example, the code may create a leaf node 110 depending from the node 108 using XML code similar to this:

```
<Add>
<CmdID> 3</CmdID>
<Item>
    <Meta>
        <Format xmlns='syncml:metinf'> format   /<Format>
        <Type xmlns='syncml:metinf'> MIDI ringing tone /<Type>
    </Meta>
    <Target>
        <LocURI> /Operator/ring_tones/smashhit#1 </LocURI>
    </Target>
    <Data> the data </Data>
</Item>
</Add>
``` where the data, is the data for creating the smashhit#1 ring tone in a format as defined by format.

The second portion 54 for carrying out executables comprises multiple sub-portions each of which is for carrying out an executable. The order of the sub-portions determines the order in which the executables are carried out. At least some of the sub-portions specify that an executable is carried out using particular data. As an example, the code for such a sub-portion may be XML code similar to this:

```
<Exec>
<CmdID> 3</CmdID>
<Item>
    <Source>
        <LocURI> /Operator/ring_tones/smashhit#1 </LocURI>
    </Source>
</Item>
</Add>
```

This exec command specifies execution of an unidentified executable on the data contained within 'source', that is the smashhit#1 ring tone. It should be noted that the Exec command does not specify which executable should be used and the meaning of the command depends upon the content type of the data which it identifies.

Figure 2:
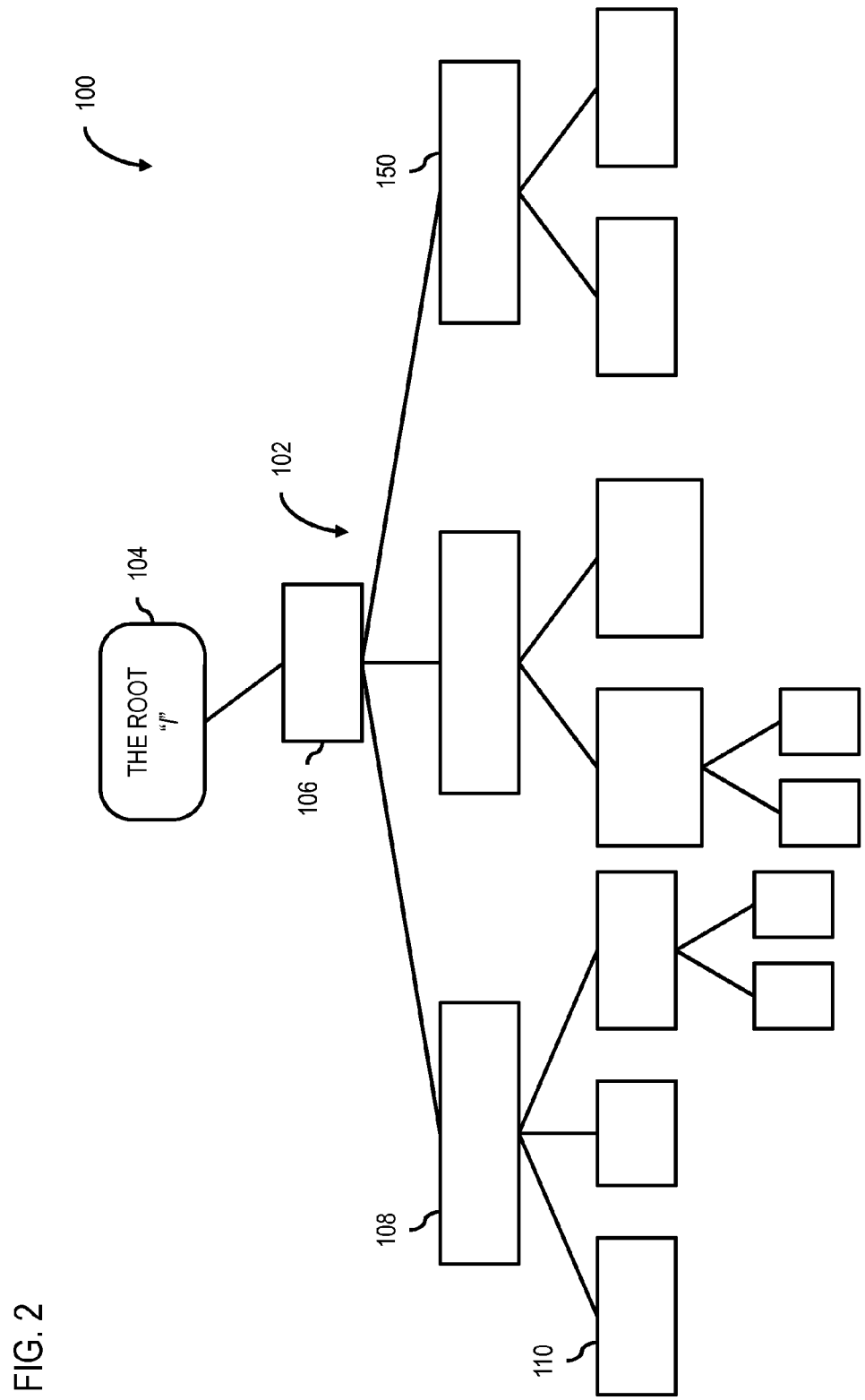
FIG. 2 illustrates a management tree data structure.

The DM client of the mobile cellular telephone processes the received set-up code 50. The portion 52 for updating an existing management tree is processed in accordance with the SyncML DM specifications. The DM client thus creates, according to the example given, a sub-tree 102 depending from the root as illustrated in FIG. 2.

The portion 54 for carrying out executables is processed as follows. The code is parsed to identify the first sub-portion. The first sub-portion is parsed to identify the URI specified by the element LocURI contained within the element source. The element LocURI identifies a leaf node within the newly created sub-tree of the management tree.

The DM client accesses the identified leaf node, which in the example given above is Operator/ring_tones/smashhit#1. It reads the properties of the identified leaf node and in particular those properties contained within meta.

The DM client uses the content of the Format element and/or the content of the Type to identify the content type of the data stored at the identified leaf node.

The DM client associates possible Formats and Types with different executables resident in the mobile telephone, for example using a look-up table. Thus, the DM client can associate an identified leaf node with an executable using the Format and/or Type of the leaf node. In this way, if the leaf node stores a sound file it is associated with an audio player, if the leaf node stores a video file it is associated with a video player, if the leaf node stores a picture file it is associated with a picture viewer, if the leaf node is a Java Midlet it is associated with the Java Virtual Machine (JVM), if the leaf node is contact details it is associated with an executable that adds it to the telephone's contact list, if the leaf node is a bookmark it is associated with an executable that adds the bookmark to the phone's bookmark list etc.

SyncML DM uses a number of different commands including:

Add: Allows an originator of the command to ask that a data element or data elements contained by the command are added to data accessible by the recipient. For example, when sent from a server to a mobile terminal it may add a node to a DM tree.

Copy: Allows an originator of the command to ask that a data element or data elements contained by the command that are accessible to the recipient are copied.

Delete: Allows the originator of the command to ask that a data element or data elements, contained in the command, that are accessible to the recipient are deleted. For example, when sent from a server to a mobile terminal it may remove a node from a DM tree.

Exec: Allows the originator of the command to ask that a named or supplied executable is invoked by the recipient.

Get: Allows the originator of the command to ask for a data element or elements from the recipient. For example, when sent from a mobile terminal to a server it may obtain the content of a node of the DM tree.

Replace: Allows the originator to ask that a data element or data elements accessible to the recipient be replaced.

SyncML DM also requires a special syntax to be use with each command. It would be desirable for each operator to be able to easily create suitable set-up code 50 without a detailed knowledge of the SyncML DM commands and their syntax. A computer program may be provided at the server 20 for doing this. The computer program effectively provides a macro that converts simple user friendly commands into the appropriate SyncML DM commands having the correct syntax.

The computer program may, for example, give the Operator the following options:
a) Install X
b) Preview X (with installation)
c) Preview X (without installation)
d) Execute X (installation implied)

The computer program, for example converts these options to:
a) a SyncML Add command
b) a SyncML Add command followed by a SyncML Exec command
c) a SyncML Add command followed by SyncML exec command followed by SyncML Delete command.
d) a SyncML Exec command.

Although embodiments of the present invention have been described in the preceding paragraphs with reference to various examples, it should be appreciated that modifications to the examples given can be made without departing from the scope of the invention as claimed. For example although described with reference to a mobile phone, it should be appreciated that the present invention can find application in any user configurable electronic device. It has particular application in mobile devices such as mobile telephones and personal digital assistants, but may also find application in personal computers, for example.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   receiving at an electronic device an executable command specifying execution of an unidentified executable on first data without specifying which executable should be used for the first data;
   determining, at the electronic device, from metadata of the first data, a content type of the first data;
   determining to identify at the electronic device an executable using the content type; and
   determining to operate on the first data using the identified executable.

2. A method as claimed in claim 1, wherein the command contains the metadata of the first data, and the metadata includes an identifier of the first data.

3. A method as claimed in claim 2, wherein the identifier identifies a node of a hierarchical nodular data structure stored at the electronic device.

4. A method as claimed in claim 3, wherein the command is a command selected from the group consisting of an Exec command, an Add command, a Copy command, a Delete command, a Get command, and a Replace command, and the identifier is a uniform resource identifier contained within a source element corresponding to the node in the hierarchical nodular data structure.

5. A method as claimed in claim 1, wherein the command is received as extensible markup language code.

6. A method as claimed in claim 5, wherein the command is a SyncML command.

7. A method as claimed in claim 5, wherein the content type of the first data is stored at a node of a hierarchical nodular data structure.

8. A method as claimed in claim 7, wherein the node is a leaf node that identifies the content type of the first data.

9. A method as claimed in claim 1, further comprising:
   determining to parse a content type of the first data based upon a node, wherein the content type of the first data is stored at the electronic device according to the node.

10. A method as claimed in claim 1, wherein the content type is determined by at least one of the value of a format element and the value of a type element associated with the first data.

11. A method as claimed in claim 10, wherein the executable is identified using a look-up table and the at least one of the value of the format element and the value of the type element.

12. A method as claimed in claim 1 further comprising determining to associate a plurality of different executables with each of a plurality of different content types.

13. A method as claimed in claim 12, wherein the plurality of different executables are stored in the electronic device.

14. A method as claimed in claim 1, wherein the executable is identified using the content type and a look-up table.

15. A method as claimed in claim 1, further comprising:
   before receiving the command specifying execution of the first data, determining to create or update a hierarchical nodular data structure at the electronic device.

16. A method as claimed in claim 15, further comprising:
   before receiving the command specifying execution of the first data, determining to create the node or a sub-tree including the node in the hierarchical nodular data structure at the electronic device.

17. A method as claimed in claim 1, wherein the command excludes information of the content type of the first data.

18. A method as claimed in claim 1, wherein the first data includes media content data.

19. A computer-readable storage medium carrying one or more sequences of one or more instructions which, when executed by one or more processors, cause an apparatus to at least perform the following steps:
   receiving an executable command specifying execution of an unidentified executable on first data without specifying which executable should be used for the first data;
   determining, from metadata of the first data, a content type of the first data;
   determining to identify an executable using the content type; and
   determining to operate on the first data using the identified executable.

20. An apparatus comprising:
   at least one processor; and
   at least one memory including computer program code for one or more programs,
   the at least one memory and the computer program code configured to, with the at least one processor, cause the apparatus to perform at least the following, receive an executable command specifying execution of an unidentified executable on first data without specifying which executable should be used for the first data, determine, from metadata of the first data, a content type of the first data, determine to identify an executable using the content type, and determine to operate on the first data using the identified executable.

* * * * *